US011143596B2

United States Patent
Dominick et al.

(10) Patent No.: US 11,143,596 B2
(45) Date of Patent: Oct. 12, 2021

(54) SPARK EMISSION SPECTROMETER AND METHOD FOR OPERATING SAME

(71) Applicant: Elementar Analysensysteme GmbH, Langenselbold (DE)

(72) Inventors: Hans Dominick, Kleve (DE); Michael Molderings, Kerken (DE)

(73) Assignee: ELEMENTAR ANALYSENSYSTEME GMBH, Langenselbold (DE)

( * ) Notice: Subject to any disclaimer, the term of this patent is extended or adjusted under 35 U.S.C. 154(b) by 0 days.

(21) Appl. No.: 16/652,344

(22) PCT Filed: Nov. 1, 2018

(86) PCT No.: PCT/EP2018/079939
§ 371 (c)(1),
(2) Date: Apr. 20, 2020

(87) PCT Pub. No.: WO2019/105678
PCT Pub. Date: Jun. 6, 2019

(65) Prior Publication Data
US 2020/0300769 A1  Sep. 24, 2020

(30) Foreign Application Priority Data
Nov. 30, 2017 (DE) .......................... 102017128469.9

(51) Int. Cl.
*G01N 21/67* (2006.01)
*H05H 1/52* (2006.01)

(52) U.S. Cl.
CPC .............. *G01N 21/67* (2013.01); *H05H 1/52* (2013.01)

(58) Field of Classification Search
CPC ...... G01N 21/67; G01N 21/718; G01N 21/65; G01N 2201/0221; G01N 33/205;
(Continued)

(56) References Cited

U.S. PATENT DOCUMENTS 3,690,146 A * 9/1972 Hofmann .............. B01L 3/0289
73/23.39
4,615,225 A * 10/1986 Sainz ..................... G01N 21/69
356/313
(Continued)

FOREIGN PATENT DOCUMENTS

DE  4008348  9/1991
DE  102015002104  8/2016
(Continued)

OTHER PUBLICATIONS

International Search Report and Written Opinion of the Searching Authority, International Application No. PCT/EP2018/079939, dated Feb. 4, 2019.
(Continued)

*Primary Examiner* — Michael P Stafira
(74) *Attorney, Agent, or Firm* — The Roy Gross Law Firm, LLC; Roy Gross

(57) ABSTRACT

The present invention relates to an optical emission spectrometer with at least one spark chamber. It comprises an oblong electrode being arranged inside thereof and at least one inlet for an inert gas. Here, the inert gas inlet is arranged such that the inert gas flows around the electrode along its longitudinal axis. In the sense of the invention, in the inert gas entry and/or between inert gas entry and electrode at least one sieve-like insert is provided and/or the electrode in the flow cross-section of the inter gas flow is surrounded by at least one sieve-like insert.

8 Claims, 1 Drawing Sheet

(58) Field of Classification Search
CPC ........ G01N 1/125; G01N 1/20; G01N 21/274;
G01N 21/3577; G01N 21/6456; G01N
21/69; G01N 2201/06113; G01N
2201/08; G01N 33/2847; G01N 33/2858;
G01N 33/2888; G01N 33/30; G01N
2021/6423; G01N 21/05; G01N 21/35;
G01N 21/6402; G01N 21/658; G01N
21/66; G01N 2201/0833; G01N
2201/0846; G01N 2201/101; G01N
2201/1087; G01N 2223/076; G01N
23/223; G01N 27/04; G01N 27/411;
G01N 27/4117; G01N 1/28; G01N
33/2025; G01N 15/0656; G01N
2015/0046; G01N 27/4145; G01N
35/1002; G01N 35/1095; G01N 27/68;
G01N 21/3504; G01N 33/497; G01N
35/1097; G01N 1/2252; G01N 15/0606;
G01N 15/065; G01N 2021/151; G01N
2021/8416; G01N 2021/95676; G01N
21/031; G01N 21/15; G01N 21/6428;
G01N 21/645; G01N 21/85; G01N 27/62;
G01N 27/70; G01N 30/84; G01N
33/0009; G01N 1/22; G01N 15/1404;
G01N 2015/149; G01N 2030/027; G01N
2030/3038; G01N 2030/6013; G01N
2030/8405; G01N 2030/8417; G01N
2030/847; G01N 2035/0405; G01N
2035/041; G01N 21/01; G01N 27/622;
G01N 27/624; G01N 30/30; G01N 30/32;
G01N 30/6017; G01N 30/6052; G01N
30/64; G01N 30/68; G01N 30/74; G01N
31/12; G01N 35/04; H05H 1/52; G02B
1/10; G02B 27/0025; G02B 27/0938;
G02B 27/10; G02B 27/1086; G02B
27/12; G02B 27/14; G02B 27/142; G02B
27/146; G02B 27/4272; G02B 3/14;
G02B 5/1814; G02B 5/1823; G02B
5/1838; G02B 5/1861; G02B 3/0006;
G02B 3/0012; G02B 6/32; G02B 6/3692;
G01B 11/14; G01B 11/25; G01J 5/0003;
G01J 5/0014; G01J 5/0022; G01J 5/004;
G01J 5/02; G01J 5/0205; G01J 5/0215;
G01J 5/029; G01J 5/041; G01J 5/048;
G01J 5/08; G01J 5/0806; G01J 5/0818;
G01J 5/0821; G01J 5/601

See application file for complete search history.

(56) References Cited

U.S. PATENT DOCUMENTS

| | | | | |
|---|---|---|---|---|
| 4,766,318 | A * | 8/1988 | Adler-Golden | G01N 21/69 250/374 |
| 6,455,850 | B1 * | 9/2002 | Coates | G01J 3/443 250/338.1 |
| 2006/0023210 | A1 * | 2/2006 | Joosten | G01J 3/443 356/313 |
| 2008/0202915 | A1 * | 8/2008 | Hieftje | G01N 27/62 204/164 |
| 2013/0148118 | A1 * | 6/2013 | Dorier | G01J 3/10 356/313 |
| 2017/0059410 | A1 | 3/2017 | Nishi et al. | |
| 2017/0343463 | A1 * | 11/2017 | Minami | G01N 15/0656 |

FOREIGN PATENT DOCUMENTS

| | | |
|---|---|---|
| EP | 0398462 | 11/1990 |
| WO | 2012028484 | 3/2012 |

OTHER PUBLICATIONS

German Search Report, German Application No. 102017128469.9, dated Aug. 21, 2018.
Office Action in India Application No. 202017026946 dated May 4, 2021, 5 pages.

* cited by examiner

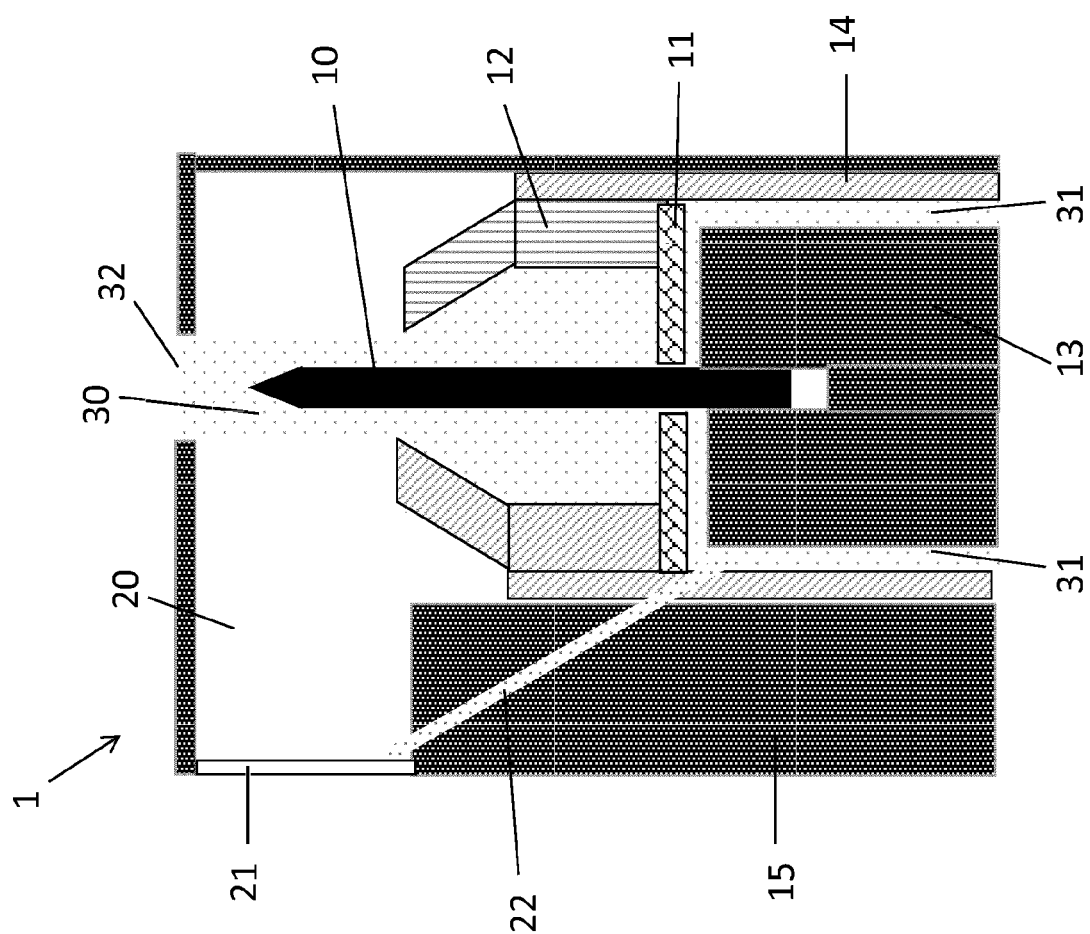

SPARK EMISSION SPECTROMETER AND METHOD FOR OPERATING SAME

CROSS REFERENCE TO RELATED APPLICATIONS

This application is a National Phase of PCT Patent Application No. PCT/EP2018/079939 having International filing date of Nov. 1, 2018, which claims the benefit of and priority to German Application No. 102017128469.9, filed on Nov. 30, 2017. The contents of the above applications are all incorporated by reference as if fully set forth herein in their entirety.

The present invention relates to an optical emission spectrometer and a method for the operation of such an optical emission spectrometer with at least one spark chamber which comprises an oblong electrode being arranged inside thereof and at least one inlet for an inert gas, wherein the inlet is arranged such that the inert gas flows around the electrode along its longitudinal axis.

An emission spectrum is the electromagnetic spectrum which is emitted from atoms, molecules or materials without any irradiation of electromagnetic radiation of the same frequency. While the emission spectrum of atoms, molecules or diluted gases is a line spectrum, hot solid bodies and liquids emit a continuous spectrum, because the single atoms in addition interact with each other and thus the discrete quantum states merge into each other.

The group of optical emission spectrometry comprises the spark emission spectrometry. This one, for example, is used for the identification of metal alloys. In this case, at first atoms or ions are energized from the energetic ground state into an energetically higher level by supplying energy. Via spontaneous emission of radiation (energy) they return into the energetic ground state. Since, on the one hand, the energy differences and according to Planck's radiation law the wave lengths are specific for elements and thus each element has its characteristic line spectrum, and, on the other hand, the intensity of the radiation is proportional to the number of atoms or ions present, both, qualitative and quantitative information about the composition of samples can be achieved.

The required energy for at first vaporizing, dissociating and/or ionizing and finally exciting a part of the sample in the case of spark emission spectrometry normally is provided by an unipolar medium voltage spark discharge with spark sequence frequencies of up to 1000 Hz. This is most often realized between two electrodes, wherein one of them consists of the sample to be analyzed and is used as cathode. For this, the sample itself has to be electrically conductive or has to be mixed and pressed as powder with an electrically conductive material (e.g. graphite). The use of argon as discharge atmosphere in comparison with air is a further decisive factor.

The sparking process consists of several steps: at first the spark chamber, thus the region between the electrode and the sample, is purged with argon for some seconds for removing the complete ambient air. Then, the so-called pre-sparking time during which several thousands of single spark discharges are used for melting and thus homogenizing a part of the sample surface follows. Hereby structural influences can be eliminated and inclusions can partially be removed.

For the analytics it is ideal, when the pre-sparking time ends in the stationary sparking condition, thus at a time point at which the sample surface has been homogenized so far that the intensities of the analysis lines measured do not change during time any longer. After the pre-sparking time the integration time follows during which in the case of typical spark emission spectrometers the intensities of several thousand single sparks are measured with photosensitive sensors, in particularly CMOS sensors or photomultipliers (PMT) and subsequently are integrated which via a calibration finally results in the output of mass proportions.

In principle, for example, DE 10 2015 002 104 A1 describes a spark emission spectrometer, wherein here the focus lies on an excitation generator with improved electric efficiency.

EP 0 398 462 A2 also describes a method and a device for optical spark emission spectrometry. The aim of the invention described here is to simplify the cleaning of the sparking chamber, whereby, optionally, also the demand for protective gas can be reduced. There are no further details about the consumption of protective gas or the influence of the flow of protective gas.

On the other hand, WO 2012/028484 A1 proposes a purge with protective gas which is oriented orthogonally with respect to the longitudinal axis of the oblong electrode generating the spark.

Here the problem is, that due to the orthogonal flow with respect to the electrode despite its very special orientation turbulences are created which in turn result in the fact that the plasma is not reliably surrounded by protective gas. Furthermore, WO 2012/028484 A1 does not address uneven sample faces, such as for example the surfaces of pipes which would also suffer a more nonuniform flow due to the orthogonal flow direction, so that no homogenous focal spot and thus a reliable measuring result can be achieved.

Therefore, it is the object of the present invention to provide a device and the corresponding method of operation with which the consumption of protective gas of a spark spectrometer independently of the surface properties of the sample used can considerably be reduced.

This is achieved with a device being characterized by the features of patent claim 1.

Such a device comprises a spark chamber in which an oblong electrode which is used as anode is arranged. In said spark chamber a gas inlet and a gas outlet are provided, wherein both are arranged in the longitudinal axis of the electrode which is provided in the spark chamber. Preferably, the longitudinal axis of the electrode and the central axis of the generated gas flow between gas entry and gas exit exactly coincide. Furthermore, the spark chamber comprises at least one window which, preferably, is arranged orthogonally with respect to the longitudinal axis of the electrode.

Decisive for the invention is that either in the gas entry and/or between gas entry and electrode at least one sieve-like insert is provided. In an alternative or in addition, also the electrode in the flow cross-section of the inert gas flow can be surrounded by at least one sieve-like insert. Preferably, two to three sieve-like inserts are provided which favorably have a mesh-like design. Through this insert the inert gas flows. The macroscopic order of these sieve-like inserts results in a homogenization of the flow, so that despite relatively high flow velocities of between 150-200 l/h a laminar flow around the electrode is developed. Particularly preferable is, when a ring-shaped laminar inert gas flow is developed along the plasma which is generated at the electrode. Thus, with the inert gas the electrode can be cooled and at the same time the plasma can be protected.

In a favorable design of the invention the sieve-like insert contains at least one metal and/or one ceramic. Particularly preferably it consists of at least one metal and/or ceramic, preferably of a sintered ceramic material. In this way, it can be guaranteed that the material used also in the case of optionally occurring relatively high temperatures remains stable. When metal is used, then normally finely woven wire meshes are used. Here, a lot of shapes of meshes are conceivable, in particularly square meshes, but also rhombus meshes or hole meshes as well as combinations of these shapes of meshes.

Furthermore, it has been shown to be favorable, when the electrode is at least partially surrounded by a nozzle, wherein it is particularly favorable, when the longitudinal axis of the electrode coincides with the rotation axis of the nozzle so that the nozzle is arranged around the electrode in a rotationally symmetric manner. According to its character, the nozzle has a decreasing diameter in a portion of the electrode, preferably into the direction of the tip of the electrode so that here a necking of the inert gas flow and thus a further increase of the flow velocity result, which further improves the cooling effect and also the focusing of the protective gas onto the plasma.

Furthermore, it has been shown to be favorable for the invention, when a further entry of the inert gas into the spark chamber is provided. With this measure also the window can be protected.

Preferably, the electrode extends from its fastening via the sieve-like insert according to the present invention and the nozzle to a region which is adjacent to at least one window. In this region also the further entry of the inert gas is provided, wherein it is arranged such that it is positioned between the direct connection of electrode and window. In this way, it becomes possible that a small amount of the protective gas purges the hollow space between window and plasma and so stabilizes the atmosphere in the whole spark chamber. At the same time with this second inert gas flow it becomes possible that no condensate which optionally is created during sparking accumulates on the window. This is important, because otherwise the condensate would falsify the measuring results.

Preferably, the window consists of magnesium fluoride ($MgF_2$) or quartz, because these materials are transparent for light having a wave length of <220 nm.

It is particularly favorable, when the further inlet for the inert gas is arranged such that the flow emerging from it deviates by at least 10° with respect to the longitudinal axis of the electrode into the direction of the window, wherein preferably the angle is between 10 and 30° with respect to the longitudinal axis of the electrode into the direction of the window. In this way, an ideal purging of the window can be achieved.

Furthermore, it has been shown to be favorable, when the electrode is fastened with an electrode collet chuck. So, it is easy to replace the electrode.

In a favorable embodiment the electrode collet chuck consists of brass which allows cost-effective manufacturing.

During the generation of sparks the electrode itself functions as anode, and therefore in a favorable embodiment it is made of tungsten or graphite, so that, on the one hand, the advantage of a high melting point and, on the other hand, a high hardness (good possibility of mechanical purification) are guaranteed.

Furthermore, in a further preferable embodiment the electrode collet chuck is arranged in a sheath made of a first insulating material. In an alternative or additional embodiment, the sheath is manufactured from a second insulating material.

It is particularly favorable, when the first and the second insulating materials are identical and/or at least one of both insulating materials contains polytetrafluoroethylene (PTFE).

Furthermore, the invention also comprises a method with the features of patent claim 11.

The method according to the present invention uses the above described device. For that an inert gas is fed into a spark chamber via a gas inlet, where it flows along the longitudinal axis of an oblong electrode. According to the present invention, the inert gas is directed through at least one sieve-like element, before and/or during flowing around the electrode.

Preferably, the inert gas is a gas containing argon in an amount of at least 99% by volume, preferably 99.9% by volume, particularly preferably 99.999% by volume. The use of argon as discharge atmosphere compared to air or similar gases has the advantage that, on the one hand, oxidation processes are prevented and, on the other hand, a measurement of element lines of <190 nm is possible, since their radiation would otherwise be absorbed in air.

By the use of the invention the content of argon can be reduced so far that the consumption of argon allows the use of argon as protective gas also in the case of small mobile apparatuses, since it is no longer necessary to provide large volumes of gas.

Further features, advantages and possibilities of use of the invention also arise from the following description of the FIGURES. Here, all described and/or figuratively presented features on its own or in an arbitrary combination are the subject matter of the invention, independently of their summary in the patent claims or their back references.

It is shown in:

FIG. 1 the setup of a spark chamber according to the present invention.

The spark chamber 1 comprises an electrode collet chuck 13 inside thereof which is preferably manufactured from brass. In this electrode collet chuck 13 the electrode 10 is inserted onto which in a not shown manner a voltage can be applied so that this electrode 10 functions as anode.

Furthermore, in the spark chamber 1 a nozzle 12 is provided which is characterized by a rotationally symmetric design. The rotation axis of the nozzle 12 coincides with the longitudinal axis of the oblong electrode 10. Electrode collet chuck 13 and nozzle 12 are at least partially surrounded by an insulating material 13. Preferably, also the nozzle 12 is manufactured from an insulating material. For example, as insulating material polytetrafluoroethylene can be used.

The electrode 10 ends in a region 20 which is adjacent to a window 21 which is preferably manufactured from magnesium fluoride. In a favorable design embodiment, the window 21 is perpendicular with respect to the longitudinal axis of the electrode. During operation a spark flashes over from the electrode 10 substantially in the direction of the longitudinal axis to a sample body which is not shown so that this sample body partially vaporizes and a plasma is created. Photosensitive sensors such as photomultipliers, CMOS and/or CCD sensors are capable of measuring emitted radiation quantitatively and qualitatively through the window 21 so that the composition of the sample can be determined.

In addition, the spark chamber 1 comprises a gas entry opening 31. Through this opening inert gas flows past the electrode cullet chuck 13 and is directed through a sieve-like insert 11. This sieve-like insert 11 consists of metal or a sintered ceramic material and favorably has a mesh-like structure. In this way, a laminar flow of the inert gas 30 is achieved which is directed by the nozzle 12 around the longitudinal axis of the electrode 10 in a rotationally symmetric manner. So, at the same time the electrode 10 is cooled and the created plasma is protected. Subsequently, the inert gas flow 30 can pass off via the gas exit 33.

Via a further inert gas inlet 22 which is preferably designed as a borehole through the inert material 15 which provides a connection to the inert gas inlet 31 inert gas is branched off and straightforwardly directed onto the window 21. So once again, the window 21 is purged in addition which reliably can help to avoid the formation of condensate without the necessity of using larger amounts of gas for purging the whole spark chamber.

LIST OF REFERENCE SIGNS

1 spark chamber
10 electrode
11 sieve-like inlet
12 nozzle
13 electrode collet chuck
14 insulator
15 insulating material
20 open region
21 window
22 further inert gas inlet
30 inert gas flow
31 inert gas inlet
32 inert gas outlet

The invention claimed is:

1. An optical emission spectrometer with at least one spark chamber comprising an oblong electrode being arranged inside thereof and at least one entry for an inert gas, wherein the inert gas entry is arranged such that the inert gas flows around the electrode along its longitudinal axis, wherein in the inert gas entry and/or between inert gas entry and electrode at least one sieve-like insert is provided and/or the electrode in the flow cross-section of the inter gas flow is surrounded by at least one sieve-like insert,
wherein a further inert gas entry is provided in the spark chamber,
wherein the electrode is at least partially surrounded by a nozzle which in at least a portion along the electrode tapers so that this results in a necking of the inert gas flow,
wherein the electrode extends to a region outside the nozzle which is adjacent to a window and that the inter gas entry of the inert gas is arranged between the window and the electrode, and
wherein the further inert gas entry is arranged such that the flow deviates by at least 10° with respect to the longitudinal axis of the electrode into the direction of the window.

2. The optical emission spectrometer of claim 1, wherein the at least one sieve-like insert contains a metal and/or a ceramic.

3. The optical emission spectrometer of claim 1, wherein the electrode is hold by an electrode collet chuck.

4. The optical emission spectrometer of claim 1, wherein an electrode collect chuck is arranged in a sheath made of a first insulating material.

5. The optical emission spectrometer of claim 1, wherein a nozzle consists of a second insulating material.

6. The optical emission spectrometer of claim 4, wherein the first and the second insulating materials are identical and/or at least one insulating material contains polytetrafluoroethylene.

7. A method for optical emission spectrometry comprising:
providing the optical emission spectrometer of claim 1;
flowing an inert gas via a gas inlet in the spark chamber along the longitudinal axis of the oblong electrode, and directing the inert gas by the at least one sieve-like insert, before and/or during flowing around the electrode.

8. The method of claim 7, wherein the inert gas contains argon in an amount of at least 90% by volume.

* * * * *